United States Patent [19]
Hasegawa et al.

[11] Patent Number: 6,003,900
[45] Date of Patent: Dec. 21, 1999

[54] FUEL TANK SUPPORTING STRUCTURE

[75] Inventors: Yasuhiro Hasegawa; Naomasa Kaneko; Satoru Sasagawa; Shinji Hinosawa, all of Wako, Japan

[73] Assignee: Honda Giken Kogyo Kabushiki Kaisha, Tokyo, Japan

[21] Appl. No.: 08/906,432

[22] Filed: Aug. 5, 1997

[30] Foreign Application Priority Data

Aug. 7, 1996 [JP] Japan .................................. 8-208354

[51] Int. Cl.$^6$ ........................................................ B60P 3/22
[52] U.S. Cl. ........................... 280/834; 280/781; 280/833
[58] Field of Search .................................... 280/834, 831, 280/833, 781

[56] References Cited

U.S. PATENT DOCUMENTS

| | | | |
|---|---|---|---|
| 5,195,780 | 3/1993 | Inoue et al. | 280/834 |
| 5,201,547 | 4/1993 | Ogawa et al. | 280/834 |
| 5,405,167 | 4/1995 | Lee | 280/834 |
| 5,542,707 | 8/1996 | Kamei et al. | 280/834 |
| 5,547,224 | 8/1996 | Kami et al. | 280/834 |
| 5,556,133 | 9/1996 | Oku et al. | 280/834 |
| 5,560,651 | 10/1996 | Kami et al. | 280/834 |

FOREIGN PATENT DOCUMENTS

| | | |
|---|---|---|
| 4080-34248 | 2/1996 | Japan . |
| 8-48163 | 2/1996 | Japan . |

*Primary Examiner*—Lanna Mai
*Assistant Examiner*—Andrew J. Fischer
*Attorney, Agent, or Firm*—Armstrong, Westerman, Hattori, McLeland and Naughton

[57] ABSTRACT

A fuel tank supporting structure is described which is effective to reliably fix a fuel tank without interfering with the layout of auxiliaries, such as a pump unit, a meter unit, and the like mounted on the fuel tank, and to ensure a sufficient volume of the fuel tank. The disclosed structure includes a subframe for supporting the fuel tank in an internal space having a pair of front and rear cross members, a pair of left and right side members, a pair of fuel tank supporting members disposed inside and below both the side members, and suspension arm supporting brackets located at a level higher than the fuel tank supporting members. The fuel tank placed on the fuel tank supporting members is fixed at its left and right opposite sides by a pair of left and right tank supporting bands which are connected at their front ends to the suspension arm supporting brackets and at its rear ends to the rear cross member.

4 Claims, 4 Drawing Sheets

FUEL TANK SUPPORTING STRUCTURE

BACKGROUND OF THE INVENTION

The present invention relates to a fuel tank supporting structure in which a fuel tank is supported on a subframe which is mounted on a vehicle body frame.

Such a fuel tank supporting structure is known, being described in Japanese Patent Application Laid-open No.8-48163. In the known fuel tank supporting structure, to support the fuel tank a pair of left and right tank-supporting bands are disposed in a longitudinal direction of the vehicle body. Front ends of the tank-supporting bands are passed through band bores defined in the fuel tank and fixed to a front cross member of the subframe, and rear ends of the tank-supporting bands fitted in a band groove, which is defined in an upper surface of the fuel tank so as to become connected to the band bore, are fixed to a rear cross member of the subframe.

The known fuel tank supporting structure suffers from a problem that the band bore and the band groove are defined near the central portion of the fuel tank where a pump unit and a meter unit are disposed and, for this reason, the pump unit and the meter unit interfere with the tank supporting band to impede the freedom of the layout. Also, the volume of the fuel tank is reduced by the presence of the band bore and the band groove.

The present invention has been accomplished with the above circumstance in view, and it is an object of the present invention to reliably fix the fuel tank without interfering with the layout of auxiliaries such as the pump unit, the meter unit, and the like, mounted on the fuel tank, and to ensure a sufficient volume of the fuel tank.

SUMMARY OF THE INVENTION

To achieve the above object, according to the present invention, there is provided a fuel tank supporting structure for a vehicle comprising a subframe formed of a pair of left and right side members extending in a longitudinal direction of a vehicle body and a pair of front and rear cross members extending in a lateral direction of the vehicle body, said side members and the front and rear cross members being coupled to form a frame-like configuration, said subframe being supported at four corners thereof on a vehicle body frame, and tank supporting bands being used to fix a fuel tank to said subframe wherein left and right portions of a lower surface of the fuel tank are supported on upper surfaces of a pair of left and right fuel tank supporting members supported inside and below said left and right side members; and left and right opposite sides of said fuel tank are fixed by a pair of said left and right tank supporting bands which are connected at front ends thereof to a pair of left and right suspension arm supporting brackets which are mounted on the left and right side members so as to protrude to a level higher than the left and right fuel tank supporting members, said supporting bands being connected at rear ends thereof to the rear cross member.

Therefore, the tank supporting bands cannot interfere with auxiliaries, such as the pump unit, the meter unit, and the like, which are mounted in a central portion of an upper surface of the fuel tank. Thus, the degree of freedom in the layout of the auxiliaries is increased, and it is unnecessary to provide a band bore and a band groove in the fuel tank, whereby the aforementioned reduction in fuel tank volume is prevented. In addition, the tank supporting bands are connected at their front ends to suspension arm supporting brackets located at a level higher than fuel tank supporting members. Therefore, the length of the tank supporting band can be shortened and, moreover, a rigidity of the support for the fuel tank is increased by supporting the tank supporting bands by utilizing the suspension arm supporting brackets which have a high rigidity and support suspension arms.

Further according to the present invention, the fuel tank may be fixed at its front portion by a tank supporting band which is connected at its left and right opposite ends to the front portions of left and right side members. Therefore, any longitudinal movement of the fuel tank can be limited by the two tank supporting bands which are disposed in the longitudinal direction of a vehicle body to fix the left and right opposite sides of the fuel tank, and any lateral movement of the fuel tank can be limited by the tank supporting band which is disposed in the lateral direction of the vehicle body to fix the front portion of the fuel tank.

DESCRIPTION OF A PREFERRED EMBODIMENT OF THE INVENTION

The mode for carrying out the present invention will be described by way of an embodiment with reference to the accompanying drawings.

Figure 1:
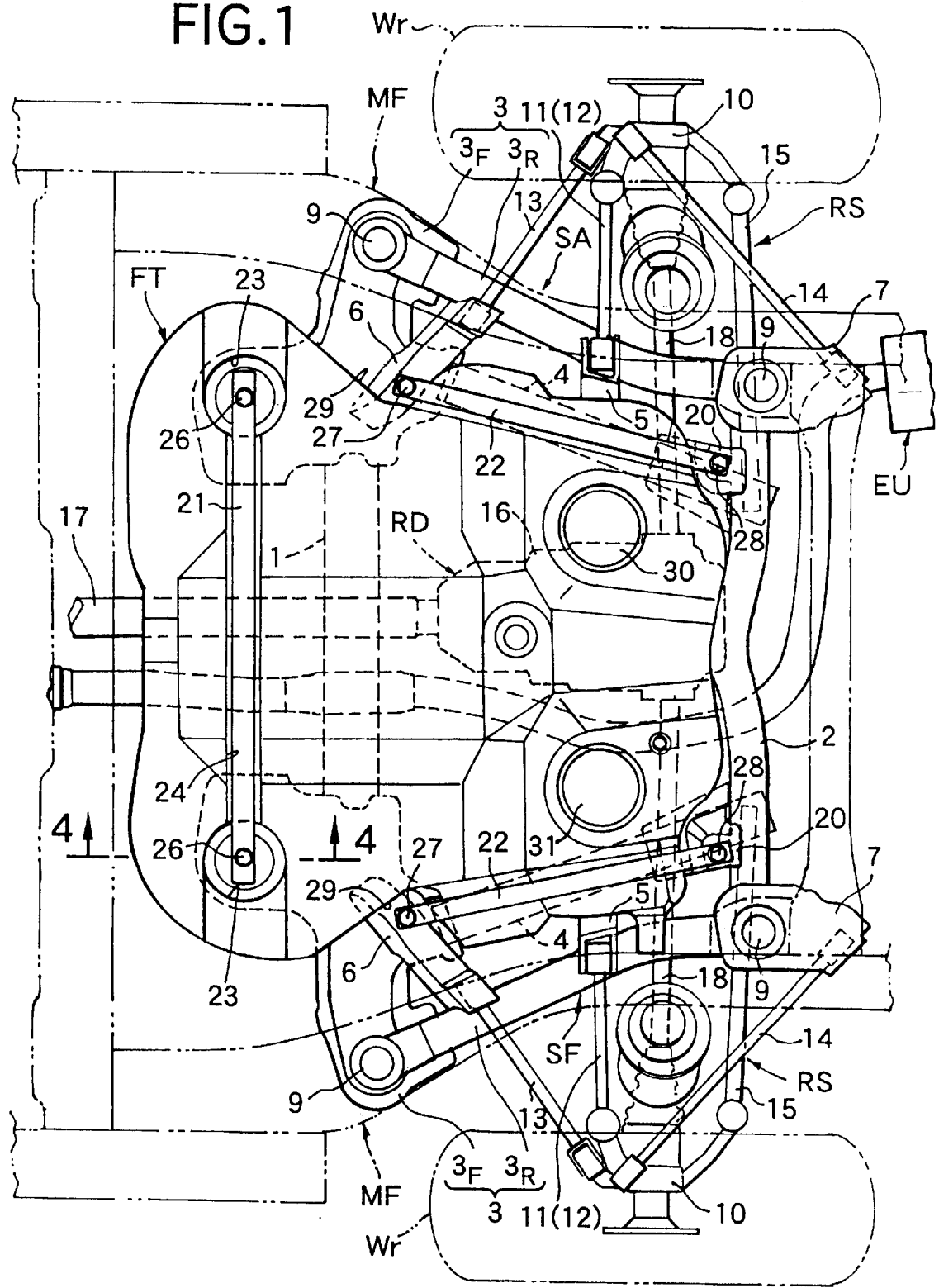
FIG. 1 is a plan view of a fuel tank mounted on a subframe.
Figure 2:
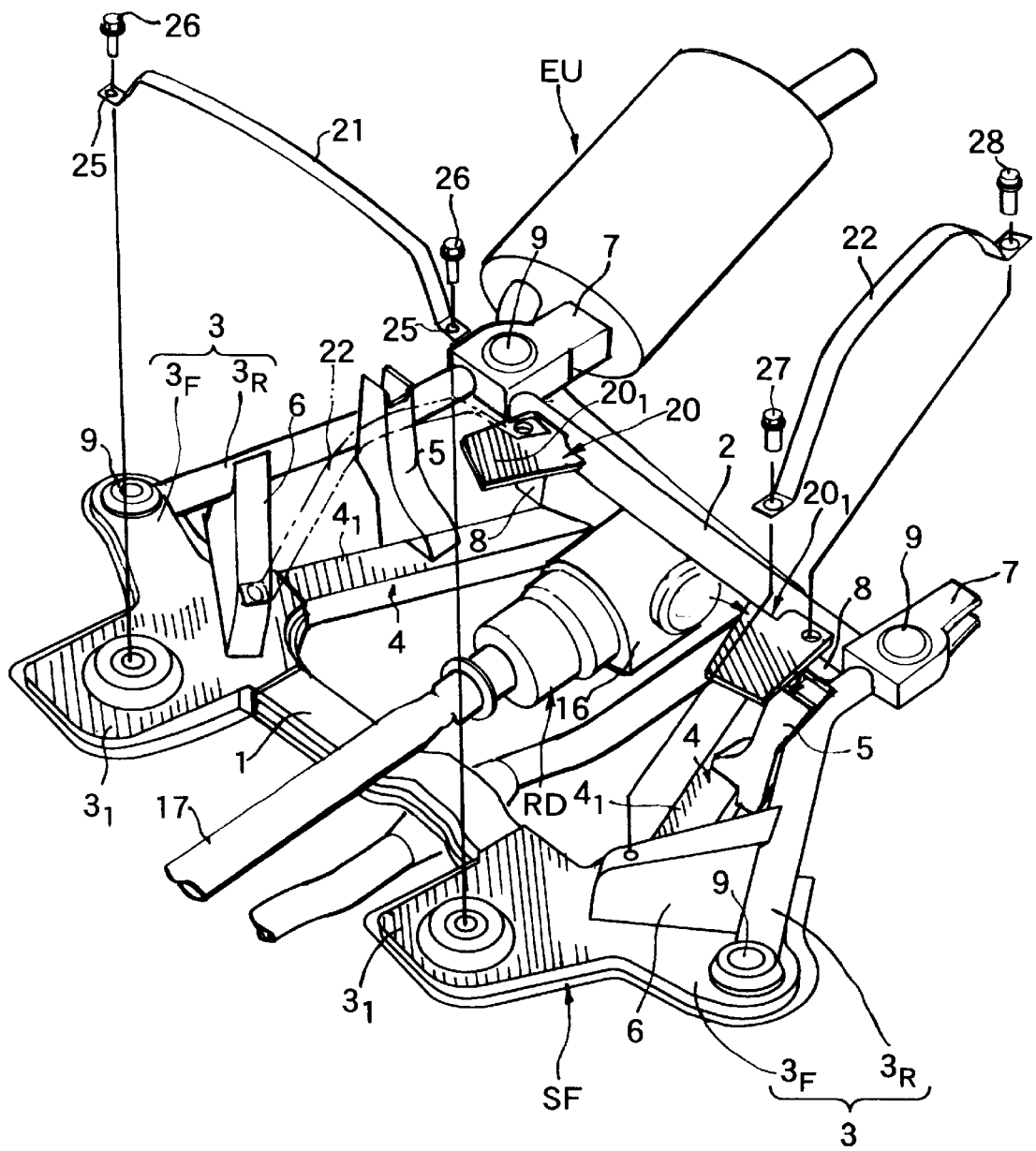
FIG. 2 is a perspective view of the subframe.

As shown in FIGS. 1 and 2, a subframe assembly SA is supported at its rear portion, as viewed in a direction of a vehicle body, on a pair of longitudinally extending left and right vehicle body frames MF, MF, and comprised of a subframe SF having a substantially rectangular planar shape, a fuel tank FT, a pair of left and right rear suspensions RS, RS which support left and right rear wheels Wr, and a rear differential RD and an exhaust unit EU, all of which are integrally assembled together. The subframe assembly SA is mounted on the vehicle body frames MF, MF in sequence in a vehicle body assembling line after the parts thereof have been previously assembled in an assembling line separate from the vehicle body assembling line.

As shown in FIG. 2, the subframe SF includes a front cross member 1 extending in a lateral direction of the vehicle, a rear cross member 2 extending in the lateral direction of the vehicle body behind the front cross member 1, a pair of side members 3, 3 extending in a longitudinal direction of the vehicle body to connect left and right opposite ends of the cross members 1 and 2, and a pair of left and right fuel tank supporting members 4, 4 extending in the longitudinal direction of the vehicle body below the side members 3, 3 and inside the vehicle body. Each of the side members 3, 3 is comprised of a front side member portion $3_F$, $3_F$ to which the left and right opposite ends of the front cross member 1 and the fuel tank supporting member 4, 4 are connected, and a rear side member portion $3_R$, $3_R$ which extends rearwards from the front side member portion $3_F$, $3_F$ and is connected to the rear cross member 2.

The side members 3, 3 and the fuel tank supporting members 4, 4 are connected to a pair of left and right first brackets 5, 5 extending vertically and disposed at a longitudinally intermediate portion of the vehicle body. The first brackets 5, 5 are welded at their lower portions to outer sides and upper surfaces of the fuel tank supporting members 4, 4 and at their intermediate portions to outer sides of upper and lower surfaces of the side members 3, 3, respectively. Further, upper portions of the first brackets 5, 5 extend to positions above the side members 3, 3, respectively.

The front and rear side member portions $3_F$, $3_F$ and $3_R$, $3_R$ are interconnected by a pair of second brackets 6, 6, respectively. A pair of third brackets 7, 7 are mounted at rear ends of the left and right rear side member portions $3_R$, $3_R$, and a pair of fourth brackets 8, 8 are mounted on the lower surface of the rear cross member 2. As can be seen from FIG. 2, upper surfaces of the second brackets 6, 6 are disposed at levels higher than the upper surfaces of the fuel tank supporting members 4, 4, respectively.

Four rubber bushing mounts 9 for resiliently supporting the subframe SF to the vehicle body frame MF, MF are provided at four corners of the subframe SF, i.e., at the junctures of the front cross member 1 and the rear cross member 2 with the left and right side members 3, 3, respectively.

As can be seen from FIG. 1, each of the rear suspensions RS is of a multi-link type and comprised of an upper arm 11 which connects a knuckle 10 for rotatably supporting the rear wheel Wr to an upper end of the first bracket 5, a lower arm 12 which connects the knuckle 10 to a lower end of the first bracket 5, a trailing arm 13 which connects the knuckle 10 to the second bracket 6, a leading arm 14 which connects the knuckle 10 to the third bracket 7, and a control arm 15 which connects the knuckle 10 to the fourth bracket 8.

The longitudinally intermediate portions of the side members 3, 3 and the fuel tank supporting members 4, 4 are interconnected by the first brackets 5, 5 and hence, the subframe SF has a high rigidity in the vicinity of the first brackets 5, 5 and at the same time, the first brackets 5, 5 themselves, due to their channel-like shape, have an increased rigidity. The upper arms 11 and the lower arms 12, 12 of the rear suspensions are supported at the upper and lower ends of the high rigid first brackets 5, 5 and hence, a load from the rear wheel Wr can be dispersed to, and received by, the side members 3, 3 and the fuel tank supporting members 4, 4. In addition, the lateral rigidity and the camber rigidity of the rear suspensions RS and RS are enhanced and moreover, the positional accuracy between the upper and lower arms 11, 11 and 12, 12 is also enhanced. Further, the number of parts and the number of the welding steps required for producing the assembly can be reduced thereby providing a decrease in cost, as compared with cases in which the brackets for the upper suspension arms 11, 11 and the brackets for the lower suspension arms 12, 12 are welded separately.

As can be seen from FIGS. 1 and 2, in the present arrangement the rear differential RD is supported at a central and rear portion of the subframe SF. A propeller shaft 17 extending forwards from a differential case 16 is passed above the front cross member 1. Axles 18, 18 extending in laterally opposite directions from the differential case 16 are passed through the knuckles 10 and connected to the rear wheels Wr.

Figure 3:
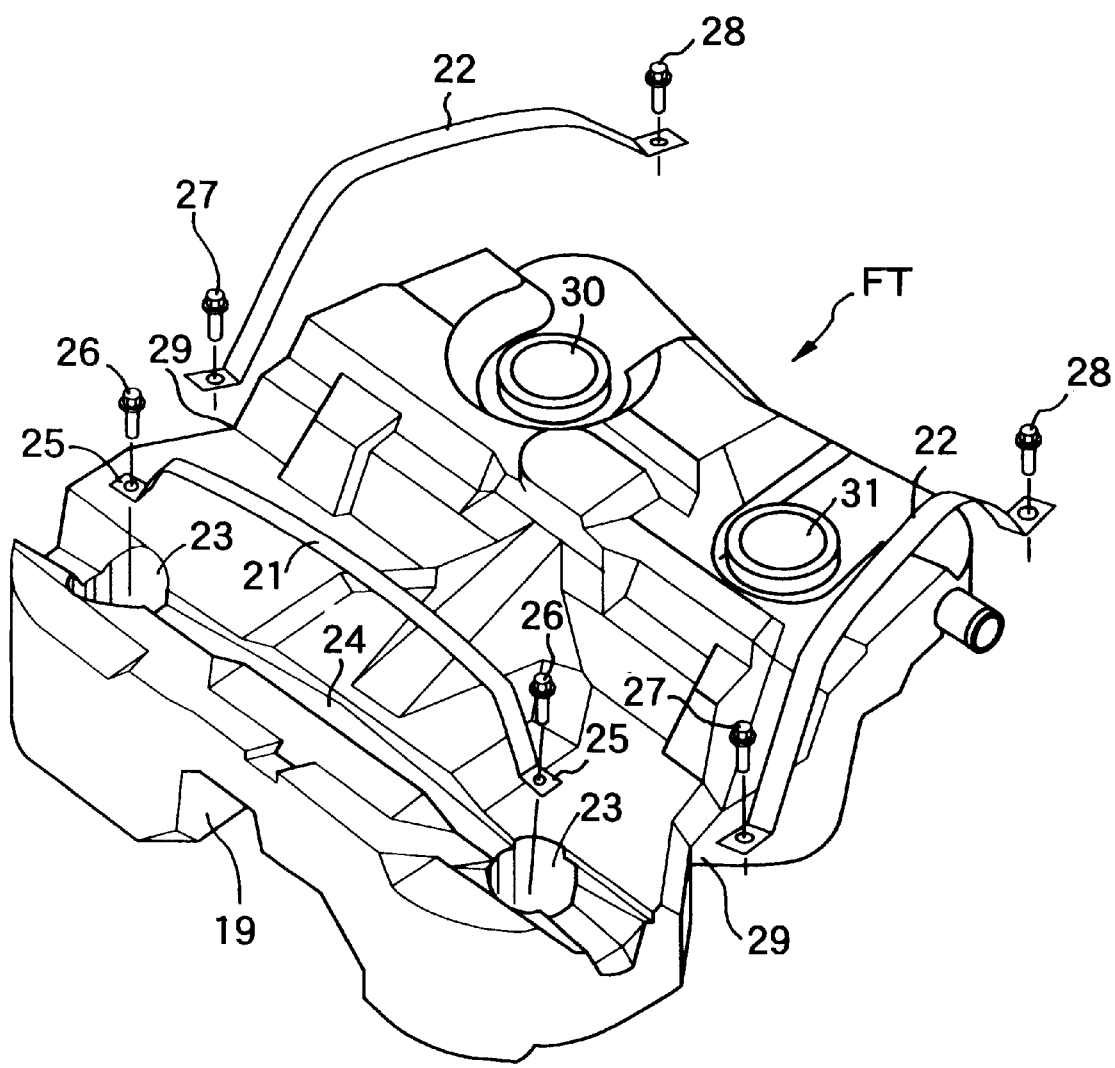
FIG. 3 is a perspective view of the fuel tank.

As can be seen from FIG. 3, the fuel tank FT is formed from a synthetic resin by a blow molding and has a tunnel portion 19 formed in its lower surface and extending longitudinally therethrough to accommodate the propeller shaft 17 and the rear differential RD. A front portion of the fuel tank FT overhangs the front cross member 1 of the subframe SF (see FIG. 1). Thus, the volume of the fuel tank FT, which is decreased due to the tunnel portion 19, can be compensated, whereby a sufficient volume of the fuel tank FT can be ensured as a whole.

A rear portion of the fuel tank FT is placed on support surfaces $20_1$, $20_1$, of two fuel tank supporting brackets 20, 20 mounted on a front surface of the rear cross member 2, and the front portion of the fuel tank FT is placed on support surfaces $3_1$, $3_1$ formed on upper surfaces of the front side member portions $3_F$, $3_F$. Left and right opposite sides of the fuel tank FT are placed on support surfaces 42, 42 formed on upper surfaces of the fuel tank supporting members 4, 4. The fuel tank FT (see obliquely lined section in FIG. 2) placed on the support surfaces $20_1$, $20_1$; $3_1$, $3_1$ and $4_1$, $4_1$ formed on the subframe SF in the above manner is fixed by a single front tank supporting band 21 and two side tank supporting bands 22, 22.

Figure 4:
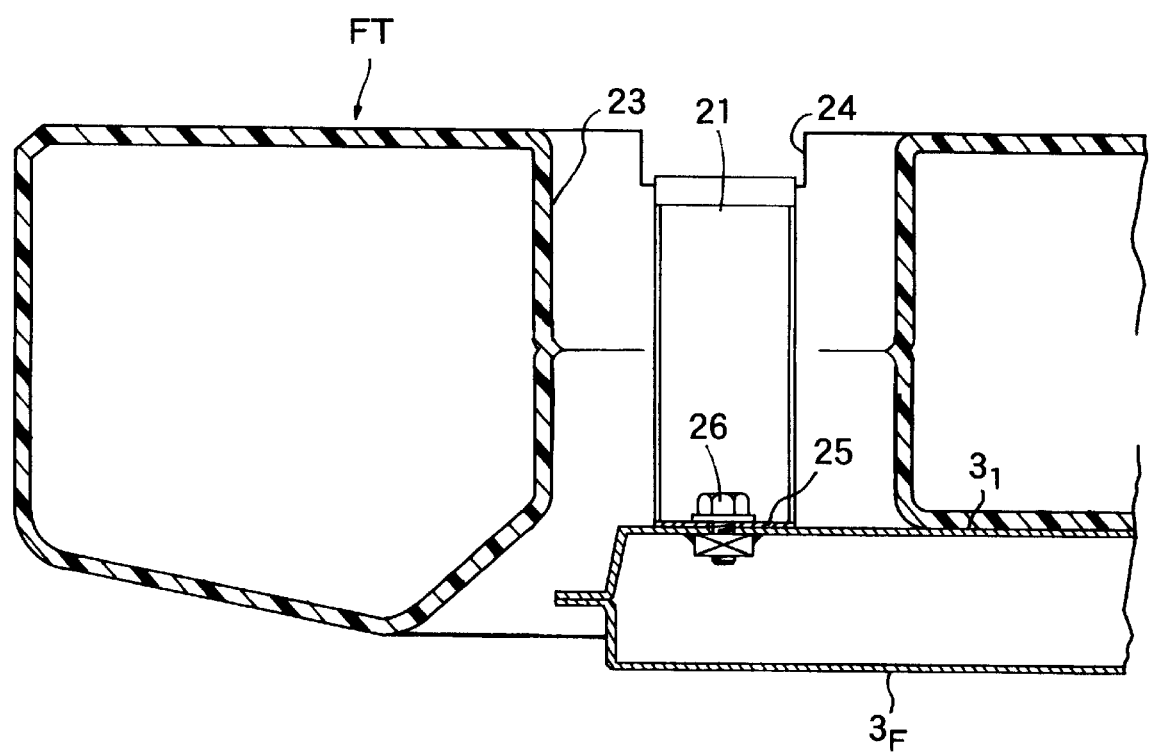
FIG. 4 is an enlarged sectional view taken along a line 4—4 in FIG. 1.

A pair of band bores 23, 23 are defined in left and right front portions of the fuel tank FT to extend vertically therethrough, and a single band groove 24 extends laterally in an upper surface of the front portion of the fuel tank FT and connects the band bores 23, 23. As can be seen also from FIG. 4, mounting portions 25, 25 are provided at opposite ends of the front tank supporting band 21 fitted in the band groove 24, and are fixed to upper surfaces of the front side member portions $3_F$, $3_F$ by bolts 26, 26 in a state where the band 21 has been passed through the band bores 23, 23.

In this way, the front tank supporting band 21 is fixed to the subframe SF in the state where it has been passed through the band bores 23, 23 formed in the fuel tank FT. Therefore, it is possible to freely establish any shape of the fuel tank FT irrespective of the shape of the subframe SF, thereby providing an increase in volume of the fuel tank FT, but also to freely establish the mounting point of the front tank supporting band 21 with respect to the subframe SF. In addition, the length of the front tank supporting band 21 can be shortened by the band bores 23, 23 and hence, it is possible to reduce the weight and facilitate the mounting operation. Moreover, the front tank supporting band 21 is positioned by the band bores 23, 23 and the band groove 24 and hence, misalignment of the fuel tank FT can be reliably prevented.

The left and right side tank supporting bands 22, 22 are fixed at their front ends to the upper surfaces of the left and right second brackets 6, 6 by bolts 27, 27 and at their rear ends to the supper surfaces of the left and right fuel tank supporting brackets 20, 20 by bolts 28, 28. Front portions of the side tank supporting bands 22, 22 extend into recesses 29, 29 defined in left and right opposite sides of the fuel tank FT. The front portions of the side supporting bands 22 engage the upper front surface of the fuel tank FT to push the lower surface of the fuel tank FT against the support surfaces $4_1$, $4_1$ of the fuel tank supporting members 4, 4. Rear portions of the side tank supporting bands 22, 22 engage rear edges of the fuel tank FT to push the lower surface of the fuel tank FT against the support surfaces $20_1$, $20_1$ of the fuel tank supporting brackets 20, 20.

In the above manner, the front ends of the side tank supporting bands 22, 22 are connected to the pair of left and right second brackets 6, 6 located at the positions higher than the fuel tank supporting members 4, 4 and therefore, the length of the side tank supporting bands 22, 22 can be shortened, as compared with a case in which the front ends of the side tank supporting bands 22, 22 are connected to the fuel tank supporting members 4, 4. Moreover, the second brackets 6, 6 are members having high rigidity and are therefore capable of supporting the trailing arms 13, 13 of the rear suspensions and hence, the fuel tank FT can be reliably fixed utilizing the second brackets 6, 6.

Further, the left and right opposite sides of the fuel tank FT are fixed by the pair of left and right side tank supporting bands 22, 22 extending in the longitudinal direction of the vehicle body. Therefore, the side tank supporting bands 22, 22 can be disposed without being governed by the projection/recess shape of the upper surface of the fuel tank FT and moreover without interfering with a pump unit and a meter unit disposed at locations identified by openings 30 and 31, respectively, at a central portion of the upper surface of the fuel tank FT. The side tank supporting bands 22, 22 are in direct contact with the outer surface of the fuel tank FT without provision of a band bore or a band groove and hence, the volume of the fuel tank FT need not be reduced.

The lateral movement of the fuel tank FT is limited by the front tank supporting band 21, and the longitudinal movement of the fuel tank FT is limited by the pair of left and right side tank supporting bands 22, 22. Therefore, it is possible to reliably prevent misalignment of the fuel tank FT.

Although the embodiment of the present invention has been described in detail, it will be understood that various modifications may be made without departing from the spirit and scope of the invention.

For example, the front tank supporting band 21 is not necessarily not required, and the fuel tank FT may be fixed by only the two side tank supporting bands 22, 22.

It will be appreciated from the above description, therefore, that the left and right portions of the lower surface of the fuel tank are supported on the upper surfaces of the pair of left and right fuel tank supporting members supported inside and below the left and right side members, and the left and right opposite sides of the fuel tank are fixed by the pair of the left and right tank supporting bands which are connected at their front ends to the pair of left and right suspension arm supporting brackets mounted on the left and right side members which extend vertically to project to a level higher than the left and right fuel tank supporting members, and which tank supporting bands are connected at their rear ends to the rear cross member. Therefore, auxiliaries, such as the pump unit, the meter unit and the like mounted at a central portion of the upper surface of the fuel tank cannot interfere with the tank supporting bands, whereby not only is the degree of freedom in the layout of the auxiliaries increased, but also it is unnecessary to provide a band bore and a band groove in the fuel tank, thereby preventing a reduction in fuel tank volume. In addition, the fuel tank can be reliably fixed by supporting the tank supporting bands by utilizing the suspension arm supporting brackets which have high rigidity and capable also for supporting suspension arms. Moreover, the tank supporting bands are connected at their front ends to the upper surfaces of the suspension arm supporting brackets located at a level higher than the fuel tank supporting members and hence, the length of the side tank supporting bands can be shortened.

Also according to the present invention, the fuel tank is fixed at its front portion by a tank supporting band connected at it left and right ends to the front portions of the left and right side members, respectively. Therefore, the fuel tank can be reliably fixed by the tank supporting band disposed in the lateral direction of the vehicle body to fix the front portion of the fuel tank in addition to the two tank supporting bands disposed in the longitudinal direction of the vehicle body to fix the left and right opposite sides of the fuel tank.

What is claimed is:

1. For a vehicle having a vehicle body frame, and wheel suspension arms, a fuel tank and a fuel tank supporting structure, comprising:

a subframe formed of a pair of left and right side members extending in a longitudinal direction of the vehicle body frame, a pair of front and rear cross members extending in a lateral direction of the vehicle body frame, and means coupling said side members and cross members to form a substantially rectangular configuration, means for supporting said subframe at four corners thereof on said vehicle body frame, a pair of left and right fuel tank supporting members supported by said subframe inside and below said left and right subframe side numbers, said left and rig fuel tank supporting members being operative on their upper surfaces to support respective lower surfaces on left and right sides of said fuel tank, a pair of left and right suspension arm supporting brackets mounted on said left and right subframe side members, respectively, so as to protrude to a level higher than said left and right fuel tank supporting members, and a pair of tank supporting bands fixing left and right portions of said fuel tank to said subframe, said tank supporting hands being connected at their front ends to said left and right suspension arm supporting brackets and connecting at their rear ends with said subframe rear cross member.

2. A fuel tank and fuel tank supporting structure according to claim 1, wherein another tank supporting band is connected at left and right ends thereof to front portions of said left and right side members, respectively, and is operative to fix a front portion of said fuel tank to said subframe.

3. A fuel tank and fuel tank supporting structure according to claim 1 wherein said fuel tank supporting structure comprises bracket means interconnecting said left and right subframe side members and said fuel tank supporting side members,respectively.

4. A fuel tank and fuel tank supporting structure according to claim 3 wherein said bracket means comprises a vertically extending bracket having a channel shape for connecting upper and lower arms of said suspension assembly.

* * * * *